(12) United States Patent
Maran et al.

(10) Patent No.: US 9,311,351 B2
(45) Date of Patent: Apr. 12, 2016

(54) TECHNIQUES TO BLOCK RECORDS FOR MATCHING

(71) Applicant: SAS Institute Inc., Cary, NC (US)

(72) Inventors: Ned Maran, Cary, NC (US); Jin-Whan Jung, Chapel Hill, NC (US); Leslie Sall, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 203 days.

(21) Appl. No.: 14/203,044

(22) Filed: Mar. 10, 2014

(65) Prior Publication Data

US 2014/0258162 A1  Sep. 11, 2014

Related U.S. Application Data

(60) Provisional application No. 61/776,753, filed on Mar. 11, 2013, provisional application No. 61/842,421, filed on Jul. 3, 2013.

(51) Int. Cl.
*G06F 7/00* (2006.01)
*G06F 17/30* (2006.01)

(52) U.S. Cl.
CPC .................. *G06F 17/30386* (2013.01)

(58) Field of Classification Search
CPC ............ G06F 17/30424; G06F 17/30351; G06F 17/30368; G06F 17/30371; G06F 17/30545
See application file for complete search history.

(56) References Cited

U.S. PATENT DOCUMENTS 5,790,645 A  8/1998 Fawcett et al.
6,714,918 B2  3/2004 Hillmer et al.
2009/0044279 A1  2/2009 Crawford et al.
2012/0158563 A1  6/2012 Song et al.
2013/0132410 A1  5/2013 Rineer

FOREIGN PATENT DOCUMENTS

WO  2008141168  11/2008

OTHER PUBLICATIONS

Christen, P., "A Comparison of Personal Name Matching: Techniques and Practical Issues", The Australian National University, Report No. TR-CS-06-02, Sep. 2006, 14 pages.

(Continued)

*Primary Examiner* — Truong Vo
(74) *Attorney, Agent, or Firm* — Kacvinsky Daisak Bluni PLLC

(57) ABSTRACT

Techniques to block records for matching are described. Some embodiments are particularly directed to techniques to block records for matching entities with inconsistent identifying information. In one embodiment, for example, an apparatus may comprise a configuration component, a coding component, a blocking component, and a matching component. The configuration component may be operative to receive a data set comprising a plurality of records and operative to receive a set of blocking variables, the blocking variables present as variables in each of the plurality of records. The coding component operative to generate match codes based on the blocking variables. The blocking component operative on the processor circuit to produce a plurality of blocks of records from the data set based on the match codes. The matching component operative to match records within each of the plurality of blocks by performing deterministic or probabilistic entity resolution based on similar variables of the records within each of the blocks. Other embodiments are described and claimed.

27 Claims, 10 Drawing Sheets

(56) References Cited

OTHER PUBLICATIONS

Christen et al., "Quality and Complexity Measures for Data Linkage and Deduplication", The Australian National University, 2007, 24 pages.

Elmagarmid et al., "Duplicate Record Detection: A Survey", IEEE Transactions on Knowledge and Data Engineering, vol. 19, No. 1, Jan. 2007, 16 pages.

Christen, Peter, "A Survey of Indexing Techniques for Scalable Record Linkage and Deduplication", IEEE Transactions on Knowledge and Data Engineering, vol. 24, No. 9, Sep. 2012, 19 pages.

TECHNIQUES TO BLOCK RECORDS FOR MATCHING

RELATED APPLICATIONS

This application claims the benefit of priority under 35 U.S.C. §119(e) to U.S. Provisional Patent Application No. 61/776,753, titled "Computer-Implemented Method for Efficient Blocking," filed on Mar. 11, 2013, which is hereby incorporated by reference in its entirety. This application also claims the benefit of priority under 35 U.S.C. §119(e) to U.S. Provisional Patent Application No. 61/842,421 titled "Computer-Implemented method for Blocking in Fraud Detection-Link Analytics for Blocking (LAB)" filed on Jul. 3, 2013, which is hereby incorporated by reference in its entirety.

BACKGROUND

Entity resolution is the task of matching records in a single table or multiple tables for the purpose of identifying same entities. Multiple records may map to the same entity but contain different information, due to either error or purposeful obfuscation. For example, someone attempting fraud may make modifications to their identifying information in order to avoid detection. Alternatively, someone's identifying information may vary between records because of transcription errors, data entry errors, data corruption, changes in information, and so forth.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to block records for matching. Some embodiments are particularly directed to techniques to block records for matching entities with inconsistent identifying information. In one embodiment, for example, an apparatus may comprise a configuration component, a coding component, a blocking component, and a matching component. The configuration component may be operative to receive a data set comprising a plurality of records and operative to receive a set of blocking variables, the blocking variables present as variables in each of the plurality of records. The coding component operative to generate match codes based on the blocking variables. The blocking component operative on the processor circuit to produce a plurality of blocks of records from the data set based on the match codes. The matching component operative to match records within each of the plurality of blocks by performing deterministic or probabilistic entity resolution based on similar variables of the records within each of the blocks. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
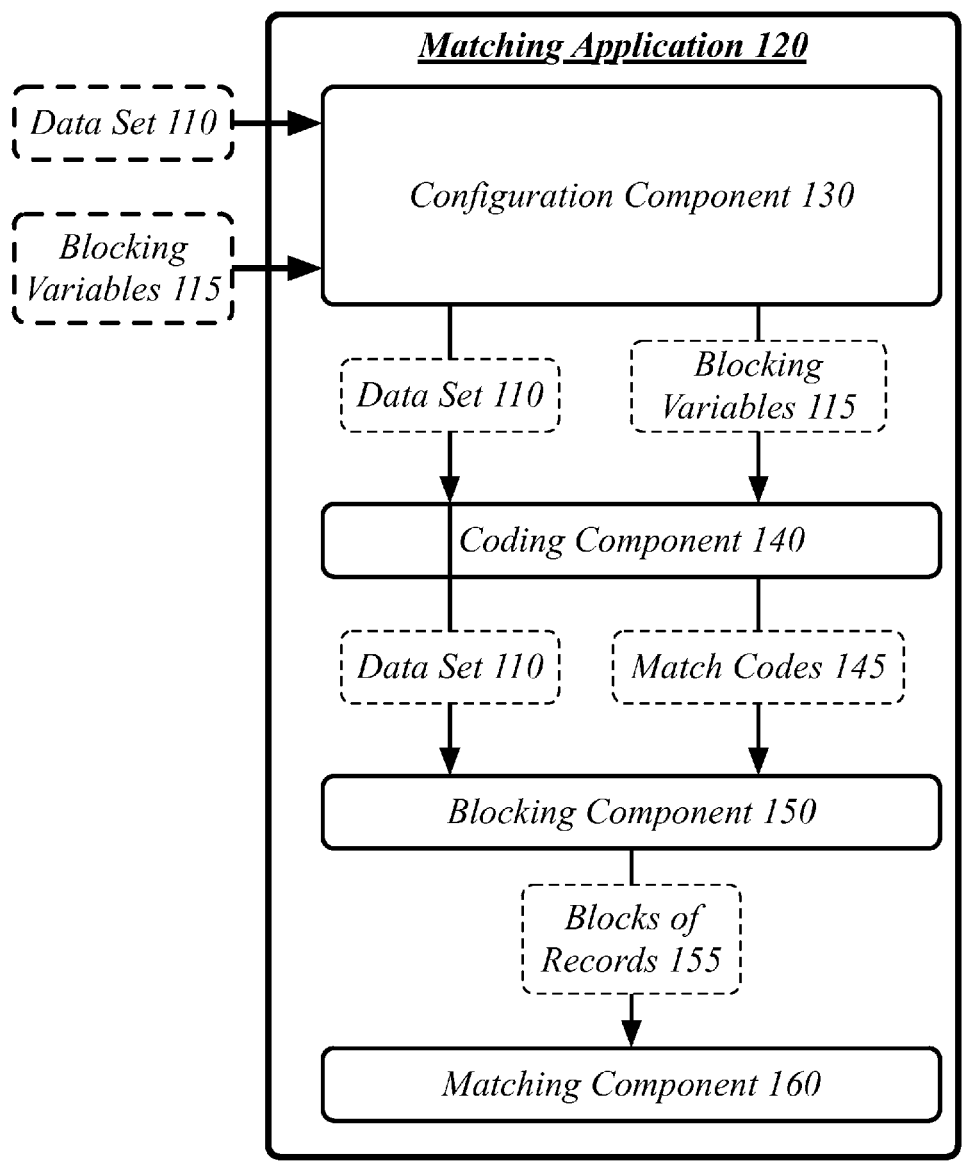
FIG. 1 illustrates an example of a link analysis system.

Various embodiments are directed to techniques to block records for matching. Records in one or more tables may correspond to entities such as people, businesses, products, and transactions. In some situations, multiple records may correspond to the same entity. In some of these cases, the multiple records may correspond to the same entity but contain different information. Transcription or data-entry errors may result in accidental differences. Changes in information, such as address or phone number, may result in differences between records that correspond to the same entity due to the differing context in which the information was received. Where multiple tables are being compared, differences in how data is structured in the tables may result in non-identical information for the same entity. Further, in some cases, people may purposefully submit incorrect information about entities, particularly where the entity in question is themselves. For instance, people committing fraud may use variations in their name, address, date of birth, identification number (such as Social Security Number), or other identifying characteristics in order to avoid detection.

As such, entity resolution may be important in a variety of tasks. Whatever the cause of differing information, identifying that multiple records correspond to the same entity allows for the determination that at least some of the information in some of the records is inaccurate. If this inaccuracy is accidental, then the inaccuracies can be resolved or flagged for resolution (such as by contacting the entity in question to verify the information, or relying on another trustworthy source of information). However, oftentimes, fraudulent entities use variations in their names, addresses or identification numbers to escape detection. As such, if the inaccuracy is purposeful, then identifying disparities may indicate that fraud has occurred or is being attempted and indicate that investigation of the entity in question, or the entities providing the inaccurate information, is warranted.

Entity resolution is the task of matching records in a single table or multiple tables for the purpose of identifying same entities. This task can be accomplished using fuzzy matching algorithms. A major impediment in implementing these matching algorithms is the number of comparisons necessary for identifying similar records. If a matching algorithm is used to match across two tables that have m and n records respectively, then for every record from one table to be compared to every record from another would result in m*n comparisons being made, for example. This makes the matching process computationally expensive even for moderately large tables. Blocking may be used to reduce the number of comparisons that need to be made in entity resolution. Blocking identifies the set of records that are potentially similar based on relevant fields such as name, address, phone numbers, identification numbers, etc. The tables are then divided into mutually exclusive blocks, such that each record is assigned to precisely one block. Then, one or more matching algorithms are applied to records within each block, such that each record is only matched against the records in its same block, dramatically reducing the number of comparisons. Further, matching within blocks can be performed in parallel since the blocks are mutually exclusive, thus making the computations more efficient. As a result, the embodiments can improve affordability and scalability for the operator of a link analysis system.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices may be shown in block diagram form in order to facilitate a description thereof. The general intention is to cover all modifications, equivalents, and alternatives consistent with the claimed subject matter.

FIG. 1 illustrates a block diagram for a link analysis system 100. In one embodiment, the link analysis system 100 may comprise a computer-implemented link analysis system 100 having a software matching application 120 comprising one or more components, such as a configuration component 130, coding component 140, blocking component 150, and matching component 160. Although the link analysis system 100 shown in FIG. 1 has a limited number of elements in a certain topology, it may be appreciated that the link analysis system 100 may include more or less elements in alternate topologies as desired for a given implementation.

The link analysis system 100 may comprise the matching application 120. The matching application 120 may be generally arranged to receive a data set 110 and to perform link analysis and matching on the data set 110. The data set 110 may be a table, listing, collection, or other set of records, where each record of the plurality of records may, non-exclusively, correspond to an entity. For instance, each of the records in the one or more tables all correspond to an entity such as an individual or a business, which may be used when detecting whether a record corresponds to an individual or business known to have engaged in or suspected of fraud. The matching application 120 determines groups of records from the data set 110 where each group of records is composed of multiple records each of which has been identified as potentially corresponding to the same entity. A group of records having been identified as potentially corresponding to the same entity indicates that beyond the general suspicion that multiple records might correspond to the same entity—one of the basic motivations for performing entity resolution in the first place—that specific evidence exists tying the multiple records within a group to the same entity, such as may be determined by a fuzzy-matching algorithm, for example.

The matching application 120 may comprise a configuration component 130. The configuration component 130 may be generally arranged to receive a data set 110, the data set comprising a plurality of records, and to receive a set of blocking variables 115, the blocking variables 115 present as variables in each of the plurality of records. Receiving the set of blocking variables 115 may refer to receiving an indication of which variables in the data set 110 should be used as blocking variables 115, as these blocking variables 115 will be present in the data set 110 in order to be used for matching. Each of the records may have a number of variables set to a particular value. A table, such as data set 110, may be formed as a plurality of variables or fields and a plurality of records where each record has a value set for each of the plurality of variables. For instance, where the data set 110 is a single table, every record in the data set 110 may share the same plurality of variables, each record having its own value for each of those variables. However, in some cases, some records may not have a value set for all of the variables. For instance, some variables may be optional (e.g., in some cases every record may have a name listed, but not necessarily a cellular telephone number). Further, where the data set 110 includes multiple tables, such as where multiple tables are being compared against each other, the different tables may not use all of the same variables as each other.

The blocking variables 115 are used in the formation of blocks of records 155. The blocking variables 115 are a subset of the total variables that records in the data set 110 may use and can be the sole variables used in determining which records are placed in which block. A variable from the data set 110 not selected as a block variable may have no effect on which block a record is placed in. The blocking variables 115 may also be used in the matching within the block, to determine which records correspond to the same entity, but the matching is not necessarily limited to using only the blocking variables 115. The blocking variables 115 may be received from and selected by a user of the matching application 120 as part of configuring the link analysis. For example, the configuration component 130 may receive the data set 110 from a user, such as by the user indicating one or more source file, server, database, or other source of data, and determine the similar variables for the data set 110. The user may then select one or more of the similar variables for use as the blocking variables 115. Two or more variables may be similar variables if they generally represent similar information, such as both representing names, addresses, occupations, etc. despite potentially having non-identical labels. For example, a "job" field and a "occupation" field are not identical, but are sufficiently similar for use in matching.

In some embodiments, such as where the link analysis system 100 is being used to identify potential cases of fraud, the entities to be identified may be individual people. As such, each of the plurality of records may non-exclusively correspond to an individual person, with the goal of the link analysis to be identifying groups of records where each of the records within a particular group are all believed to correspond to the same particular individual. In this situation, the blocking variables 115 may be selected as one or more of name, date of birth, phone number, identification number (such as Social Security Number), and address, for example.

The matching application 120 may include a coding component 140. The coding component 140 may be generally arranged to generate match codes 145 for fuzzy matching based on the blocking variables 115. A match code can represent a translation of a variable to a standardized representation for use in matching. A match code may have associated with it a specific level of sensitivity, where the standardized representation is more representative of small changes in the source variable for match codes with a higher level of sensitivity, and the standardized representation may be less representative of small changes in the source variable for match codes with a lower level of sensitivity. A variety of techniques may be used in the creation of match codes 145 and the match code translation may be specific to an identified type of a variable. For example, a name-specific technique for translation a variable storing a name to a name match code may involve using as the match code of the first four letters of a stored name, the initials of a stored name, a concatenation of the first letters of the first name and last name of a stored name, etc. Or it may convert the name to a string of letters, numbers and special characters using a set of pre-configured rules. Similarly, a variety of match code translations may be used for addresses, dates of birth, phone numbers, identification numbers, credit card numbers, or any other type of variable used.

In some cases, multiple blocking variables 115 may be combined together in the creation of match codes. For example, a name-specific match code translation may generate name match codes based on a name blocking variable, an address-specific match code translation may generate address match codes based on an address blocking variable, and then the final match codes 145 for each record may be generated by combining together the name match code and address match code for each record into a single code. Combining match codes from different variables may involve concatenating them together into a single unit or merely associating them in a data structure so as to allow for joint comparison with the combined match codes of other records.

The coding component 140 may receive the data set 110 and block variables 115 from the configuration component 130 and generate specific match codes 145 for each of the records in the data set 110 according to the block variables 115. In some embodiments, the coding component 140 may consider all of the records from the data set 110 and generate match codes 145 prior to the blocking being performed by the blocking component 150. In other embodiments, the coding component 140 may generate match codes 145 on-demand for the blocking component 150 such that as the blocking component 150 requests or retrieves a match code from the coding component 140 for each specific record in turn as it is assigned to blocks. In other embodiments, the coding component 140 may generate match codes 145 in parallel with the blocking of the data set 110, such as in a multi-threaded, multi-processor, or multi-server environment, wherein one thread, process, server, or other computational unit generates match codes 145 and another performs blocking, with the blocking unit waiting on the generation of match codes if it runs ahead of the match code unit. It will be appreciated that a variety of techniques may be used to coordinate the creation of match codes 145 by the coding component 140 and their consumption by the blocking component 150.

The matching application 120 may include a blocking component 150. The blocking component 150 may be generally arranged to produce blocks of records 155 from the data set 110 based on the match codes 145. The blocks of records 155 may be created such that each block of the set of blocks includes all records that share any of the match codes 145 with any other record in the block. This does not mean that each of the records have precisely the same value for each of those variables, but instead that the values are sufficiently similar according to the translation metric used for generating the match codes 145 as to map to a common code. It is this grouping of records with a common match code that sets the stage for the direct comparison of records with similar, but not necessarily identical, values for the blocking variables 115.

The matching application 120 may include a matching component 160. The matching component 160 may be generally arranged to match records within each of the blocks of records 155. In some embodiments, each of the records within a particular block may be directly compared to all of the records within that block. This comparison may involve performing deterministic or probabilistic entity resolution based on similar variables of the records being compared. These similar variables may include the blocking variables 115, may also include additional similar variables, and may not make use of all the blocking variables 115 as appropriate for the comparison being made. Any of the techniques for deterministic or probabilistic entity resolution may be used, including both general-purpose algorithms and algorithms for specific uses such as error detection, fraud detection, and other application of entity resolution.

The matching application 120 may then output the results of the matching performed by the matching component 160. This may include, for instance, a listing of every entity detected as potentially being referenced by multiple records, with the listing of each such entity associated with those multiple referencing records. This listing may then be examined by a human operator of the link analysis system 100 to evaluate the matches made and to decide how to act on them, which may vary according to the purpose of the link analysis (fraud detection, error detection, etc.).

In some cases, matching may be performed not to find multiple records corresponding to the same entity but to find another relationship between entities. For example, match codes 145 may be generated from blocking variables 115 that store the primary care physician used by the entity represented by the record. The blocks of records 155 may therefore have a single block for each primary care physician used by someone referenced by a record in the data set 110. The matching within each block may, in this example, then be an analysis of whether particular patterns or relationships exist within the records in each block. For instance, if multiple records within a block indicate that their referenced individual has a conviction for the illegal distribution of prescription pharmaceuticals, then the primary care physician associated with that block may be flagged for follow-up, such as further real-world investigation, to see whether they are possibly associated with a criminal conspiracy to illegally distribute prescription drugs.

In general, a wide variety of possible associations may be grouped together into blocks based on match codes from blocking variables, with those associations analyzed to determine whether one or more patterns of interest are present in the grouped records. The use of match codes, which allow for blocking based on non-identical instances of one or more variables, may aid this by eliminating cases where non-identical information is stored in the records for the blocking variables 115 due to accident, inconsistent naming conventions, or purposeful attempts to hide an activity through the use of incorrect information.

Figure 2:
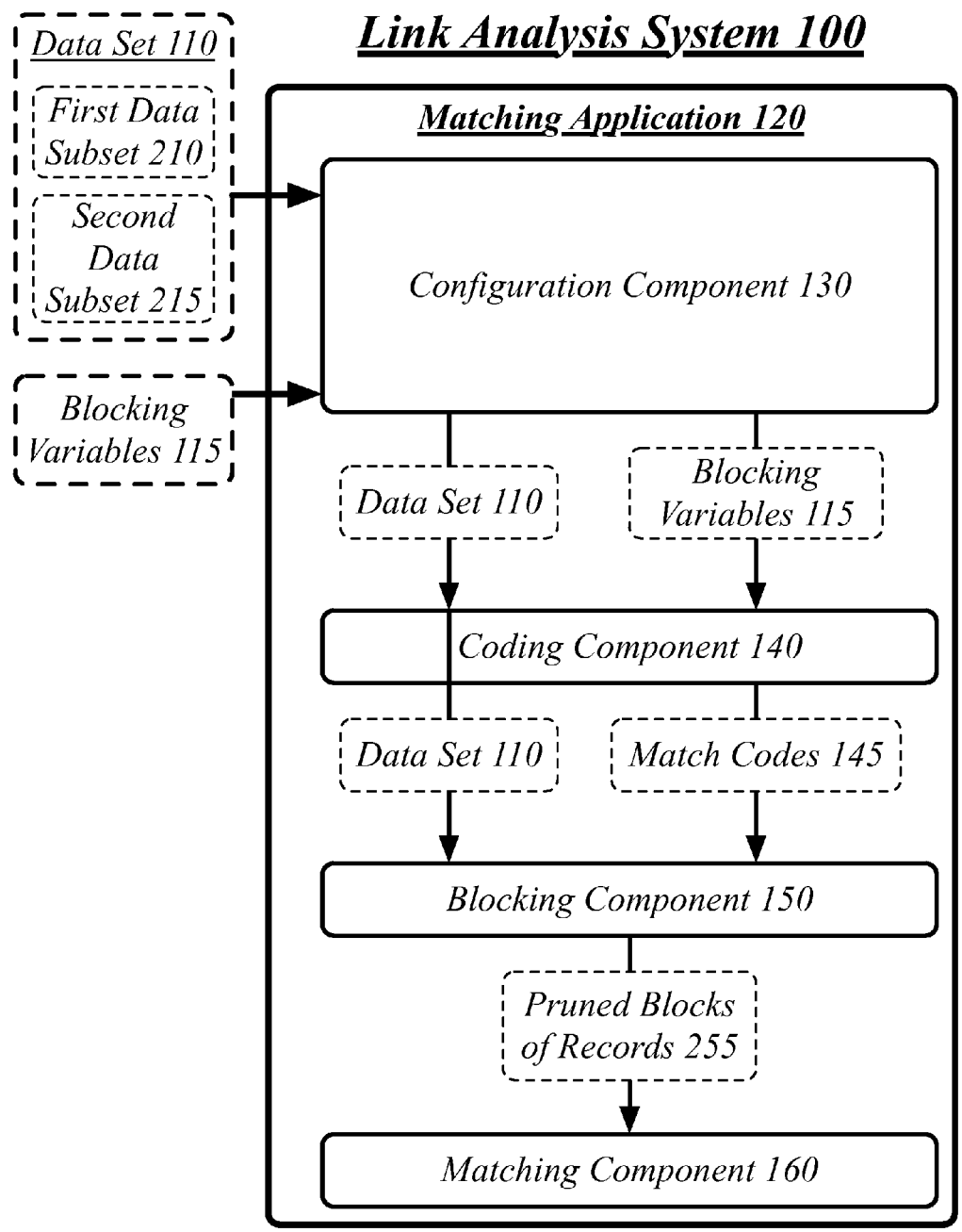
FIG. 2 illustrates an example of the link analysis system receiving a data set composed of two data subsets.

FIG. 2 illustrates an embodiment of a link analysis system 100 receiving a data set 110 composed of two data subsets 210 and 215. As shown in FIG. 2, the configuration component 130 receives the first data subset 210 and second data subset 215 for link analysis.

The first and second data subsets 210 and 215 may comprise two tables with the same fields or with differing fields. However, for comparison, at least some of the variables for the two subsets must match. In some cases, the tables themselves may use different names for the fields (e.g., a "name" field in one may correspond to a "full name" field in another), with the identification of common fields performed or verified by a human operator of the matching application 120 as part of configuration via the configuration component 130. The blocking variables 115 are therefore selected from the similar variables of the two data subsets 210 and 215. It will be appreciated that more than two data subsets may be used.

In some cases where two or more data subsets are used the goal may be to specifically find entities referenced by both (in the case of two data subsets) or all data subsets, with each table known, believed, or assumed to contain at most one record per associated entity. This may have use in, for example, joining two databases. Where one database is being merged with another, records from the two databases that correspond to the same entity may be merged into a single record, while records from one database that do not match with records from the other are imported into the latter without being joined with another record.

In these cases, therefore, there may be no interest in comparing any record to another record from its originating data subset. Therefore, prior to the matching by the matching component 160, in some embodiments the blocking component 150 may exclude from the plurality of blocks those blocks that only has records from one of the two data subsets 210 and 215. This may produce a set of pruned blocks of records 255, which include only those blocks from the blocks of records 155 that contain at least one record from each of the data subsets 210 and 215.

The matching component 160 may therefore be operative to only match within the blocks of the pruned blocks of records 255. Further, the matching component 160 may be operative to only match, within each of the blocks, records from one data subset against records from the other data subset, not to perform matching between records from the same data subset.

It will be appreciated that the use of multiple data subsets to form the data set 110 does not necessitate the pruning of blocks that do not have records from multiple data subsets or the exclusive matching of records between data subsets. In some cases, data set 110 may be processed according to the matching application 120 in a manner agnostic to it being sourced from multiple subsets (such as multiple databases), with the possible exception of ensuring that the blocking variables 115 are selected from variables common to all of the data subsets. In general, a human operator is used to determine which fields from one data subset correspond to which fields from another.

Figure 3:
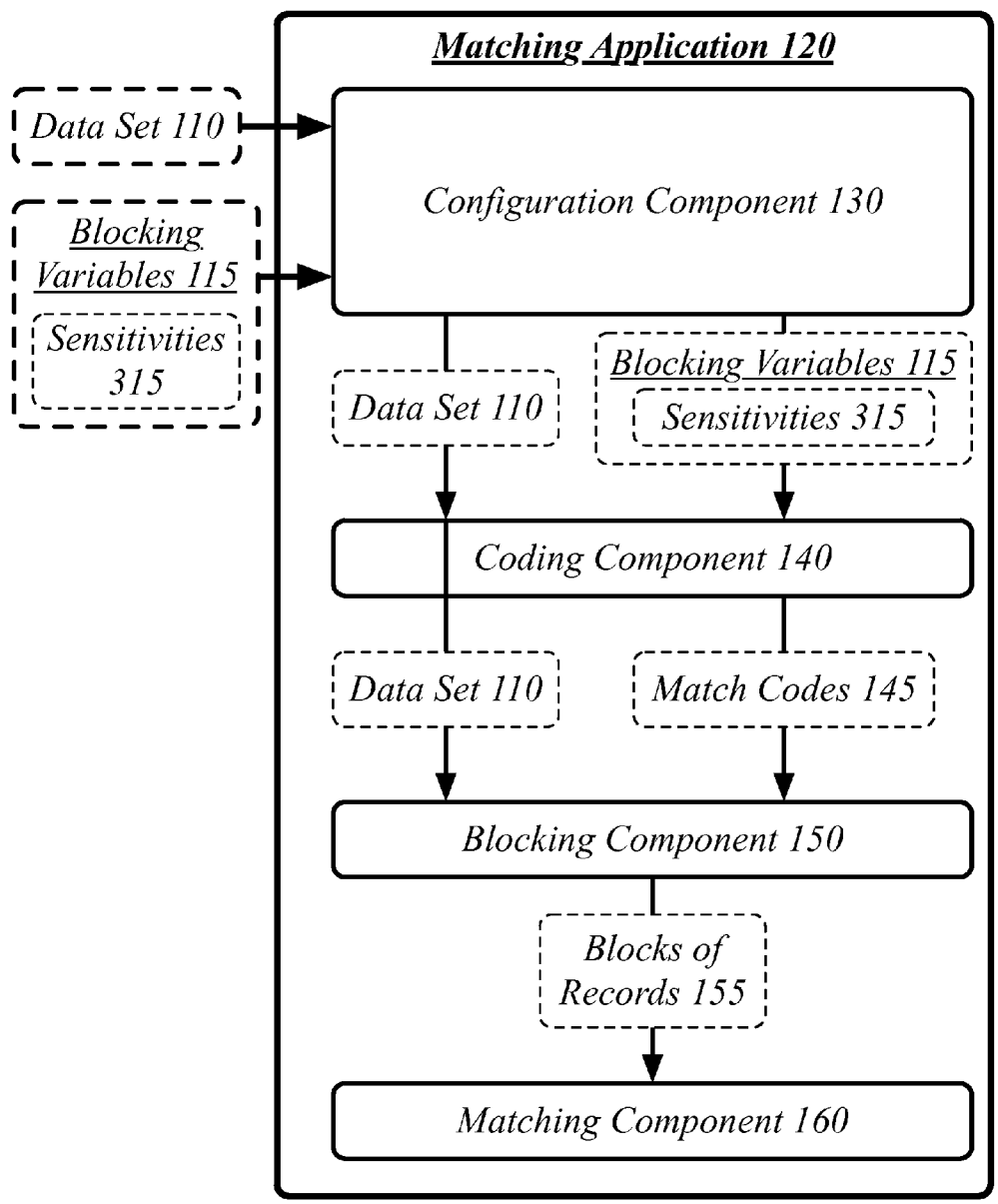
FIG. 3 illustrates an example of the link analysis system where block variables are associated with sensitivities.

FIG. 3 illustrates an embodiment of the link analysis system 100 where the block variables 115 are associated with sensitivities 315. As shown in FIG. 3, the block variables 115 have associated with them sensitivities 315 where each block variable has associated with it a particular sensitivity.

Match codes are a representation of an instance of variable where each instance of that variable is translated according to a match-code translation scheme to a standardized form. Because, in many cases, multiple source instances may be translated to the same code, records with different information stored in a particular field may be assigned to the same block because those different values for that field translate to the same code.

For example, one translation scheme for a name field might be to exclude middle names, exclude suffixes (e.g. Jr., JD, III), exclude titles and prefixes (e.g. Mrs., Doctor), standardized the capitalization of last names, and transform variations on first names which may correspond to the same first name into a determined standard variation. For instance, "TOM J. GREENGRASS" and "Mr. Tommy Greengrass" might both be translated to a standardized form of "Thomas Greengrass." This may serve to avoid records being determined as non-matching due to mere differences in the particular form of a name entered into a particular database. A sensitivity for a field, such as the name field, may therefore correspond to a selection of a particular translation scheme for the field, such as described here.

However, some translation schemes—and in some cases a particular type of match code may be inherently associated with a particular translation scheme, such that the use of a different translation scheme corresponds to the use of a different type of match code—may allow for a numerical sensitivity to be specified. A translation scheme applied with a higher sensitivity would therefore be a manner of translating from a source field to a match code that maps fewer possible source fields to the same match code. Similarly, a translation scheme applied with a lower sensitivity would be a manner of translating from a source field to a match code that maps a greater number of possible source fields to the same match code. For example, a name-specific translation scheme might, at a higher sensitivity, might not assign the same match code for "John Smith" and "Johnn Smith" whereas a lower sensitivity might assign them the same match code.

As such, in general, each of the blocking variables 115 may have associated with it a particular translation scheme corresponding to a particular type of match code and may have specified with it a sensitivity, such as a numerical value representing the specified sensitivity. The coding component 140 may be operative to use the specified sensitivities 315 with the blocking variables 115 to produce the match codes 145, where the similarity of instances of the blocking variable sufficient to map to the same match code is higher for blocking variables with a higher sensitivity and lower for blocking variables with a lower sensitivity.

The sensitivity used for a particular blocking variable may be selected, either programmatically or by a human operator, according to the importance of the source fields. In some general situations, the sensitivity may be selected by a human operator, judging based on the context, importance, and cleanliness of the various variables. For instance, a joint match code may be used, wherein multiple blocking variables 115 are specified, each instance of each blocking variable for each record is translated to a partial match code specific to that blocking variable, and the partial match codes for each record concatenated together to form the joint match code that is ultimately used in blocking the records. If one of the partial match codes is more important than another (because it corresponds to a more important blocking variable), that partial match code may be assigned a lower sensitivity, so as to allow for less discrimination between different values for the associated blocking variable. For example, a human operator may determine that the name field of a database is more important for fraud detection than the address field and indicate this relative importance to the configuration component 130 or make use of this relative importance in the assigned of sensitivities 315 to these blocking variables 115, with the name field therefore being assigned a less sensitive variation on the name translation scheme as compared to the sensitivity used for the address translation scheme.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
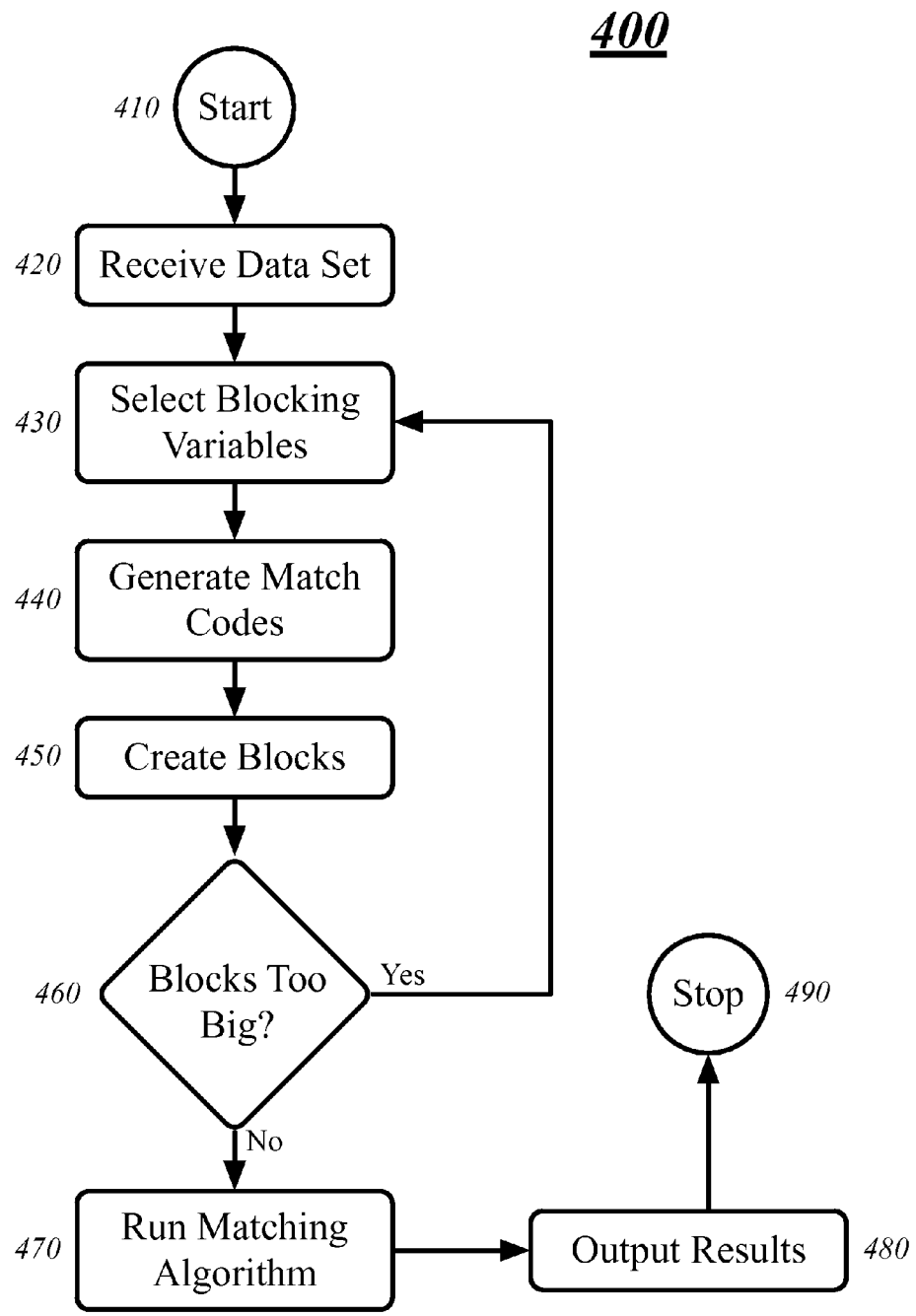
FIG. 4 illustrates an example of a logic flow for matching records.

FIG. 4 illustrates an embodiment of a logic flow 400 for matching records. The logic flow 400 may be representative of some or all of the operations executed by one or more embodiments described herein.

In the illustrated embodiment shown in FIG. 4, the logic flow 400 starts at box 410. Box 410 represents the initiation of the matching process, and may correspond to the launching of the matching application 120 or otherwise with the commencement of a human operator interacting with the matching application 120, or may correspond to the programmatic initiation of the matching application 120, such as where the link analysis system 100 is configured to periodically perform entity resolution according to pre-specified blocking variables 115 and sensitivities 315 on predefined databases. Such periodic entity resolution may be used, for example, where an institution wishes to perform nightly analyses for fraud detection on databases that are updated during the day. The logic flow 400 proceeds from box 410 to box 420.

The logic flow may receive the data set 110 at box 420. Receiving the data set 110 may correspond to an operator indicating the data set 110 to be used, or may correspond to the matching application 120 establishing a connection to a predefined database, such as where the link analysis is regularly scheduled and programmatically initiated on the schedule. The logic flow 400 proceeds from box 420 to box 430.

The logic flow may select blocking variables 115 at box 430. Selecting the blocking variables may correspond to an operator indicating the blocking variables 115, or may correspond to the matching application 120 retrieving predefined blocking variables 115, such as where the link analysis is programmatically initiated. The blocking variables 115 may be received along with sensitivities 315. The logic flow 400 proceeds from box 430 to box 440.

The logic flow may generate match codes 145 at box 440. The match codes 145 may be generated according to the selected blocking variables 115 and their selected sensitivities 315. The logic flow 400 proceeds from box 440 to box 450.

The logic flow may create blocks of records 155 at box 450. Each record from the data set 110 is assigned to a specific block, with no record being assigned to more than one block. In some embodiments, such as where multiple databases are being compared, any blocks that do not contain records from more than one database may be excluded. The logic flow 400 proceeds from box 450 to box 460.

The logic flow may determine whether any of the blocks are too big at box 460. The goal of blocking, to reduce the number of direct comparisons made, can be undone, at least in part, by allowing some of the blocks to grow too big. For particularly large data sets a sufficiently bad blocking can result in an overly complex computational problem. As such, the matching application 120 may generate narrowed match codes where it is determined that at least one block of the plurality of blocks has at least a threshold number of records. Narrowed match codes may refer to match codes that match to less potential records than the match codes prior to narrowing as the narrowed match codes are more restrictive in what they will match to. In embodiments where only blocks with records from more than one data subset will be matched, the determination of whether any block meets the threshold for re-blocking will be determined based on the sizes of the pruned blocks of records 255, excluding those blocks which contain records from only one data subset that will, therefore, not be matched.

The threshold may be set according to a variety of techniques. In some embodiments, the threshold may be user-defined, entered during the configuration of the link analysis along with the specification of the data set 110 and the blocking variables 115 with their sensitivities 315. The threshold may be predefined within the matching application 120, determined according to analyses of acceptable runtimes for matching. A plurality of threshold options may be predefined within the matching application 120, such as through a list of options or slider in the configuration of the matching application 120, empowering an operator to indicate their degree of tolerance for longer runtimes. In embodiments where only records from different data subsets will be compared, the threshold may be determined according to the number of comparisons that would be used to perform matching within a block, taking into account the relative distribution of which data subset the records within the block belong to: a block of 1000 records of which 999 are from a first data subset 210 and 1 from a second data subset 215 uses only 999 comparisons to match, while a block of 1000 records of which 500 are from the first data subset 210 and 500 from the second data subset 215 uses 250,000 comparisons to match.

If none of the blocks of records 155, or pruned blocks of records 255, is too big, then the logic flow 400 proceeds to box 470 where the matching algorithm is run within the blocks, then to box 480, where the results are outputted, and finally to box 490, wherein the matching process stops.

If any of the blocks of records 155, or pruned blocks of records 255, is too big, then the logic flow 400 loops back to box 430, the selection of blocking variables. The logic flow 400, at box 430, may then modify which blocking variables 115 are used. As records will be assigned to the same block so long as the match code for any blocking variable matches between records, one of the blocking variables 155 may be added or match code sensitivity increased. Therefore, the blocking variables 155 may be programmatically adjusted, or adjusted through an interaction with the operator, to decrease the extent to which records are blocked together. If a blocking variable is being dropped, then where an importance or sensitivity is supplied for each of the blocking variables 115, the least important or most sensitive blocking variable may be automatically dropped. If a variable is being added to the blocking variables 115, then where an importance or sensitivity is supplied for each of the variables, the most important variable not currently included in the blocking variables 115 may be added. The logic flow 400 then, as before, proceeds to box 440.

The logic flow 400 at box 440 may then again generate match codes. In some embodiments, in addition to or as an alternative to changing the blocking variables 115, the sensitivities used to generate the match codes 145 may be adjusted. A more sensitive match code, a match code having increased sensitivity, is expected to match together fewer records, and is therefore expected to produce smaller blocks. The sensitivities 315 may therefore be automatically increased for one or more of the blocking variables 115 so as to reduce block size. In various embodiments, the increase in sensitivity may be concentrated in the most important blocking variable, the least important blocking variable, or distributed equally across all of the blocking variables. The logic flow then, as before, proceeds to box 450.

In some embodiments, the narrowed match codes may only be used on the records stored in those blocks which meet the threshold. Any blocks falling below the threshold may be left as they are and processed according to the blocking under the previous match code translation scheme. The records from blocks meeting the threshold are returned to a common pool and re-blocked according to the new, narrowed match codes to produce a new blocking of those records. This process may continue iteratively, where any of the new blocks that fall below the threshold are matched as they are while any of the new blocks that still meet or exceed the threshold are again reprocessed with even narrowed match codes.

With at least one of the selection of blocking variables 115 and the selection of sensitivities 315 having been adjusted, the new match code schemes are used at create blocks at box 450. The size of these blocks is then considered again at box 460, either proceeding to running the matching algorithm at box 470 or looping back to box 430 again, as according to whether any of the blocks of records 155 exceeds the threshold.

The embodiments are not limited to this example.

Figure 5:
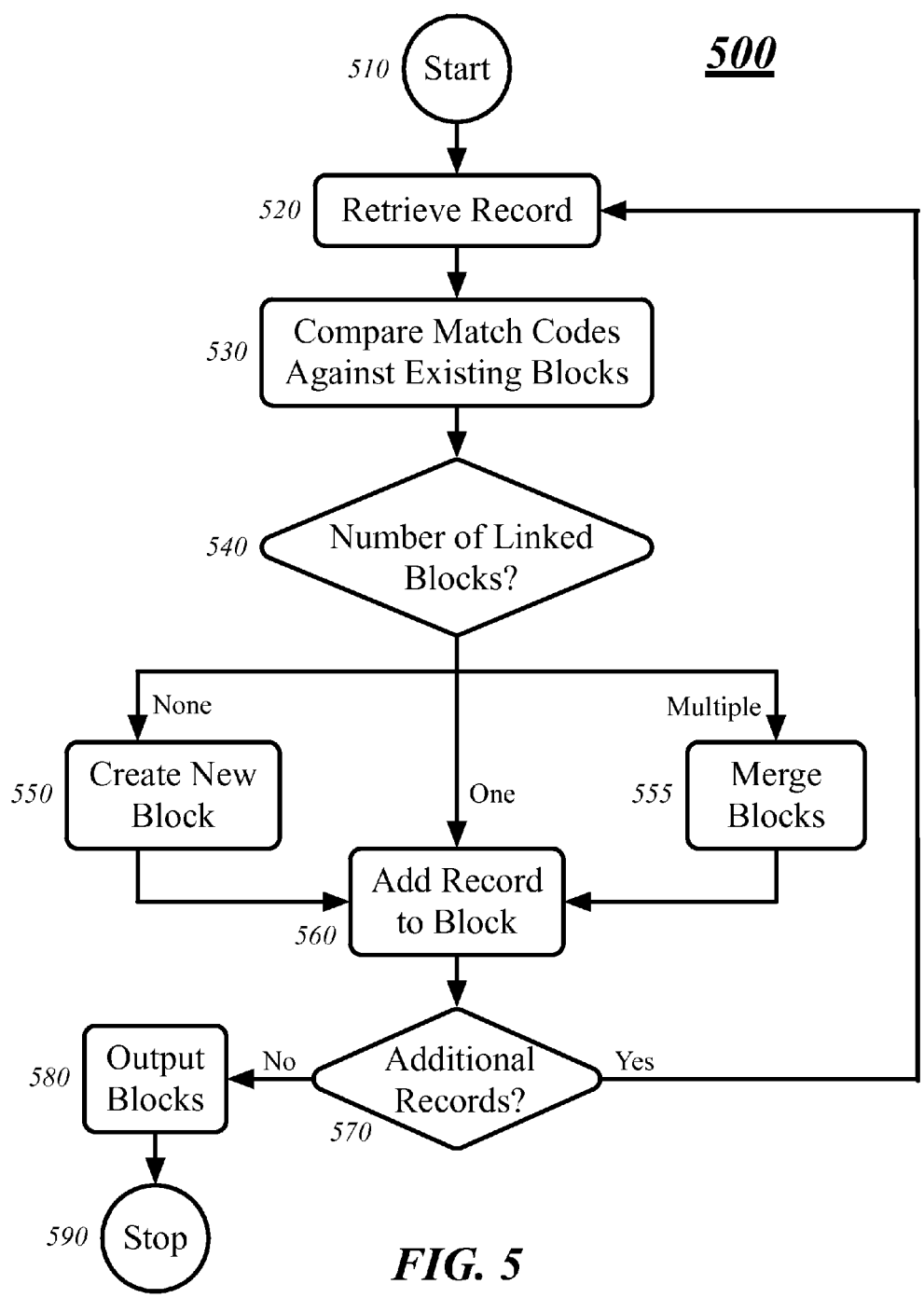
FIG. 5 illustrates an example of a logic flow for blocking records.

FIG. 5 illustrates an embodiment with an example of a logic flow 500 for blocking records. The logic flow 500 may be representative of some or all of the operations executed by one or more embodiments described herein.

In some embodiments, where multiple blocking variables 115 are used to generate the match codes 145, the resulting match codes 145 are treated as a complete unit, with the concatenation (or other combination) of codes producing a unique code that must be matched in its entirety for two records to be assigned to the same block. However, in some embodiments, where multiple blocking variables 115 are used to generate the match codes 145, the resulting match codes 145 are individually compared, and two records will be assigned to the same block if any of their match codes match. The former technique produces smaller blocks, but may allow the resolution of entities that match according to one variable but are dissimilar in another, such as a person who has moved to a sufficiently different address so as to produce a different address-based match code.

The logic flow 500 may start at box 510. Box 510 may represent the initiation of a blocking subroutine, such as may be used by the blocking component 150 and at box 450 of logic flow 400 of FIG. 4. The logic flow 500 may then proceed to box 520.

The logic flow 500 may retrieve the next record at box 520. The next record may be determined according to any known technique. In this embodiment, as the assignment of records to blocks will produce the same blocks no matter the order in which the records are examined, this ordering is not determinative of the output and the records may be retrieved in whatever manner is most efficient and/or convenient given the data structure used to store and manage them. For instance, records stored in a queue may be retrieved in queue-order while records stored according to unique identifiers in a database may be retrieved according to the order of their unique identifiers. The logic flow 500 may then proceed to box 530.

The logic flow 500 may compare the match codes generated for the retrieved record against existing blocks at box 530. Where only one blocking variable is used, at most one existing block can be matched against. However, where multiple blocking variables are used—records are to be blocked together whenever any match—then more than one block may contain records with at least one matching match code.

Consider, for example, a blocking scheme using two blocking variables, the name field and the address field. A record being examined may have "Dot Alexander" as the name and "4210 Stuart Street, Cary, NC" as the address. The name field "Dot Alexander" might produce the same match code as for "Dorothy Alexander," which might match against a record with the name field "Dorothy F. Alexander", with the same match code, stored in a first existing block. The address field "4210 Stuart Street, Cary, NC" might produce the match code for "Cary, North Caroline," which might match against a record with the address field "890 Smith Street, Apt. B, Cary, NC," with the same match code, stored in a second existing block. Each of these blocks might contain additional records matching on the same or other match codes based on the same or other blocking variables.

Once the match codes are compared against the existing blocks—each block may have associated with it a listing of every distinct match code for every record currently stored in it—the logic flow 500 may proceed to box 540. The logic flow 500 may branch based on the number of linked blocks (blocks containing records with matching match codes) at box 540. If no blocks are linked, the logic flow 500 may proceed to box 550. If one block is linked, the logic flow 500 may proceed to box 560. If multiple blocks are linked to the record, the logic flow 500 may proceed to box 555.

If just one block is linked, the logic flow 500 may add the record to that block at box 560. If no blocks are linked, the logic flow 500 may create a new block and assign to it the match codes of the retrieved record at box 550, and then proceed to box 560 to add the record to the new block. If multiple blocks are linked, the logic flow 500 may merge the multiple blocks together into a single block at box 555, and then proceed to box 560 to add the record to the resulting merged block. Merging together two or more blocks may involve replacing the existing two or more blocks with a new block composed of all of the records from the blocks being merged.

Once the record has been added to a block at box 560, the logic flow 500 may proceed to box 570. The logic flow 500 may then check whether additional records are available for blocking at box 570. If there are, the logic flow 500 may proceed to box 520 and continue the iterative process of retrieving records and assigning them to blocks. If there are not any additional records, the logic flow 500 may proceed to box 580, output the blocks at box 580, and then proceed to box 590 to stop. Outputting the blocks may involve, for instance, passing the block of records 155 to the matching component 160 for matching. Similarly, stopping logic flow 500 may involve, with reference to FIG. 4, proceeding to box 460 from box 450 in logic flow 400.

The embodiments are not limited to this example.

Figure 6:
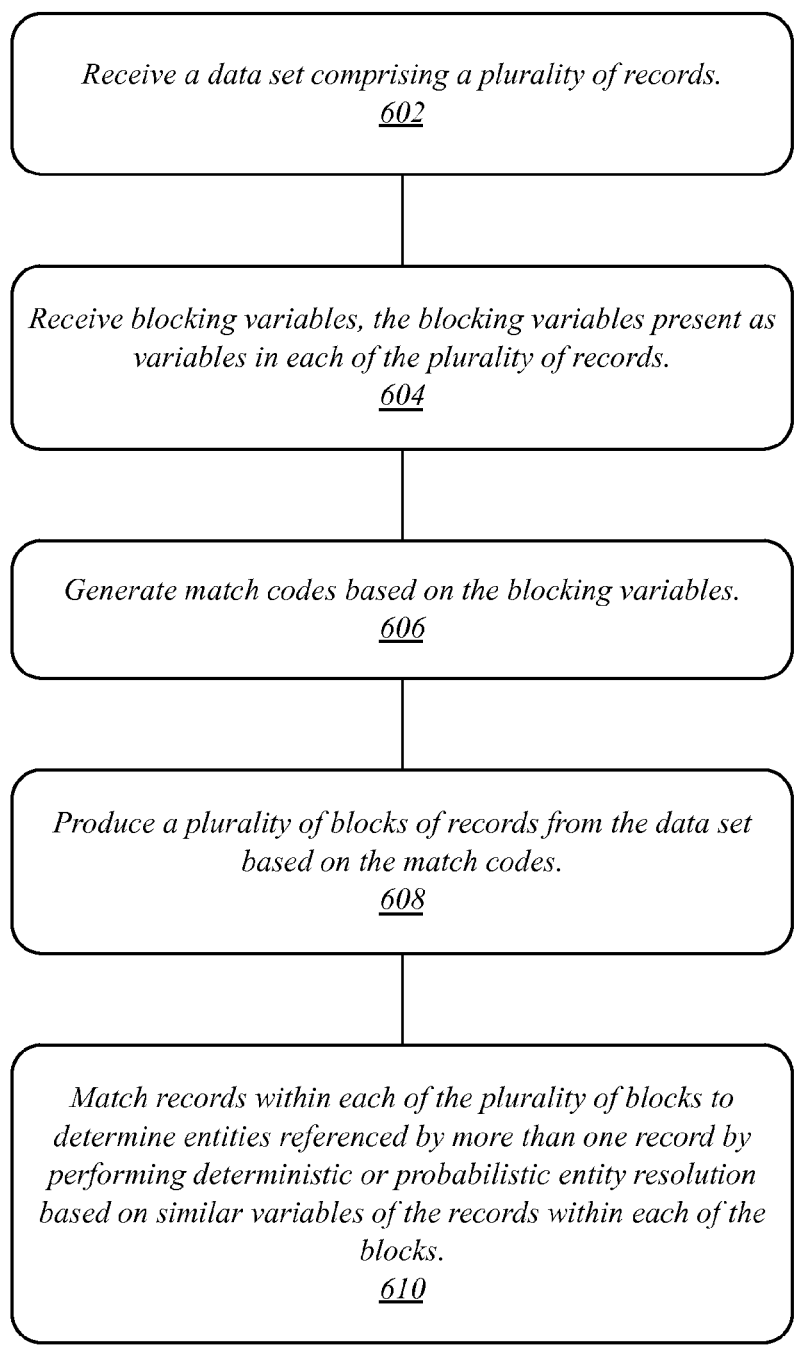
FIG. 6 illustrates an embodiment of a logic flow for the system of FIG. 1.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may receive a data set 110, the data set 110 that includes records at box 602. For example, each of the plurality of records may correspond to an entity, such as an individual or business. The blocking variables may therefore be selected as one or more of name, data of birth, phone number, identification number, and address. In many of the cases where each of the plurality of records non-exclusively corresponds to an individual, then two records will be matched if the two records are determined to correspond to a same entity.

The logic flow 600 may receive blocking variables 115, where the blocking variables 115 are present as variables in each of the records at box 604. For example, a user may link one or more databases to the matching application 120, indicating them jointly as the data set 110 for use in link analysis. The user may then be shown a list of all of the variables for the data set 110 (which may be referred to as "fields" in the context of databases) and asked to link together equivalent variables for different databases or to confirm programmatically-determined links between equivalent variables, if necessary. The user may then select one or more of the variables for use as blocking variables 115. When selecting blocking variables 115 the user may specify an absolute importance of each of the blocking variables 115 or may specify a relative importance of each of the blocking variables 115, such as by ordering them from most-to-least important.

The logic flow 600 may generate match codes 145 based on the blocking variables 115 at box 606. The match codes 145 may be generated according to a specific sensitivity. These sensitivities 315 may be specifically inputted by a user when configuring the matching application 120 or may be derived from priorities indicated by a user, such as an indicating of relative importance of the variables. The sensitivities 315 used in the generation of the match codes 145 may change over the lifetime of logic flow 600, such as where a new or revised blocking is performed to reduce the maximum block size of the blocks of records 155.

The logic flow 600 may produce a plurality of blocks of records 155 from the data set 110 based on the match codes 145 at box 608. Each record may be exclusively signed to a single block, such that where a record links to match codes in more than one block the more than one blocks are merged together prior to the record being added. Once all of the records have been assigned to blocks, any block that does not contain records from at least two data subsets may be deleted, ignored, or otherwise excluded before matching within the blocks is performed.

The logic flow 600 may match records within each of the plurality of blocks of records 155 to determine entities referenced by more than one record by performing deterministic or probabilistic entity resolution based on similar variables of the records within each of the blocks at box 610. The similar variables used with the deterministic or probabilistic entity resolution may by some or all of the blocking variables 115, may be other variables, or may be a combination of some or all of the blocking variables 115 and other variables from the data set 110. For example, the matching may be performed using a deterministic or probabilistic entity resolution technique, wherein non-identical data sets are compared for sufficient similarity as to indicate that they reference the same real-world entity (e.g., an individual, a business, a transaction, etc.). This deterministic or probabilistic entity resolution may be performed at a particular level of sensitivity distinct from the sensitivities 315 associated with the blocking variables 115. The sensitivity of the deterministic or probabilistic entity resolution may be configured by an operator using the configuration component 130. In some embodiments, an output that two or more records are believed to correspond to the same entity may be outputted along with a degree of confidence indicating the extent of the similarity or derived identity of the records. The deterministic or probabilistic entity resolution may be performed using any of the variables of the records, which may include but is not limited to the blocking variables 115.

The embodiments are not limited to this example.

As an example, consider two publicly available tables that list individuals and businesses banned from or excluded from participating in certain government programs. The first table is the List of Excluded Individuals and Entities (LEIE) published by the Office of the Inspector General in the US Department of Health and Human Services. The second table is the New Jersey Debarment List (NJ Debar) published by the State of New Jersey. LEIE has 48626 rows and NJ Debar has 2140 rows as of the date the tables were retrieved from their respective web sites. Both tables have the following columns in common: Name, Address, City, and ZIP Code. These information is as of the date the tables were retrieved from their sources.

The objective is to match records in both tables to identify individuals and businesses that appear in both exclusion lists. Without blocking, over 104 million record comparisons will need to be made using a deterministic or probabilistic matching algorithm. Using the proposed computer-implemented blocking method, the number of comparisons is reduced to just 743. Note that the maximum number of matches between the two tables can only be 2140, the row count of the smaller table, assuming no duplicates. The following sequence of steps was executed to arrive at the blocks:

1. Standardize and clean individual name, business name, and address fields. Parse individual names into first and last name.
2. Concatenate the tables.
3. Create match codes for individual name, business name, address, and city fields.
4. Create three composite match codes—name match code+address match code, name match code+city match code, name match code+ZIP code.
5. Run link analytics on the three composite match codes and keep only blocks that contain records from both tables.
6. The link analytics produces the following blocks:

| Block Size | Number of Blocks | Number of Within Block Comparisons |
|---|---|---|
| 2 | 644 | 644 |
| 3 | 31 | 93 |
| 4 | 1 | 6 |
| Total: | 676 | 743 |

7. Run deterministic or probabilistic matching algorithm within each block.

In a first approach, a quick and easy way to create blocks is to use the first letter of the last name and block records that have the same first letter. Using this approach on the LEIE and NJ Debar tables would result in about 6 million comparisons. While this approach produces far fewer comparisons than using no blocking scheme (6 million vs. 104 million), it still produces immensely more comparisons than the proposed computer-implemented blocking method. This approach assigns providers to the same block regardless of their full name, address, city and zip as long as they have the same first letter in their last names. On the other hand, if the first letter of a record contains a typo, it will not be assigned to the correct block.

| First Letter | LEIE Record Count | NJ Debar Record Count | Number of Within Letter Comparisons |
|---|---|---|---|
| A | 2053 | 133 | 273049 |
| B | 4191 | 139 | 582549 |
| C | 3680 | 174 | 640320 |
| D | 2352 | 99 | 232848 |
| E | 979 | 40 | 39160 |
| F | 1754 | 95 | 166630 |
| G | 2528 | 103 | 260384 |
| H | 3296 | 80 | 263680 |
| I | 294 | 33 | 9702 |
| J | 1454 | 64 | 93056 |
| K | 1695 | 80 | 135600 |
| L | 2338 | 93 | 217434 |
| M | 4537 | 203 | 921011 |
| N | 985 | 44 | 43340 |
| O | 745 | 39 | 29055 |
| P | 2534 | 131 | 331954 |
| Q | 111 | 5 | 555 |
| R | 2624 | 131 | 343744 |
| S | 4585 | 225 | 1031625 |
| T | 1736 | 81 | 140616 |
| U | 184 | 15 | 2760 |

-continued

| First Letter | LEIE Record Count | NJ Debar Record Count | Number of Within Letter Comparisons |
|---|---|---|---|
| V | 783 | 27 | 21141 |
| W | 2650 | 80 | 212000 |
| X | 7 | 0 | 0 |
| Y | 292 | 10 | 2920 |
| Z | 228 | 8 | 1824 |
| Total: | | | 5996957 |

In an alternative approach, a second method for creating blocks is to use match codes for names and block records that have the same match codes. This approach assigns providers to the same block as long as they have the same name match code regardless of their address, city and zip thus resulting in unnecessary comparisons. Using this approach on the LEIE and NJ Debar tables results in 1442 comparisons. This approach produces about twice the number of comparisons as that of the proposed computer-implemented blocking method.

| Block Size | Number of Blocks | Number of With-in Block Comparisons |
|---|---|---|
| 2 | 690 | 690 |
| 3 | 117 | 351 |
| 4 | 23 | 138 |
| 5 | 11 | 110 |
| 6 | 4 | 60 |
| 7 | 1 | 21 |
| 9 | 2 | 72 |
| Total: | 848 | 1442 |

Another alternative, more restrictive, approach for creating blocks is to use all four blocking variables—name match code, address match code, city match code and zip—and block records that match on all four. Compared to the proposed computer-implemented blocking method, this approach will miss blocking same providers if they have typos or missing values in their address, city or zip fields in either of the two data sources. Using this approach on the LEIE and NJ Debar tables results in 506 comparisons, while missing valid matches.

| Block Size | Number of Blocks | Number of Within Block Comparisons |
|---|---|---|
| 2 | 455 | 455 |
| 3 | 17 | 51 |
| Total: | 472 | 506 |

Figure 7:
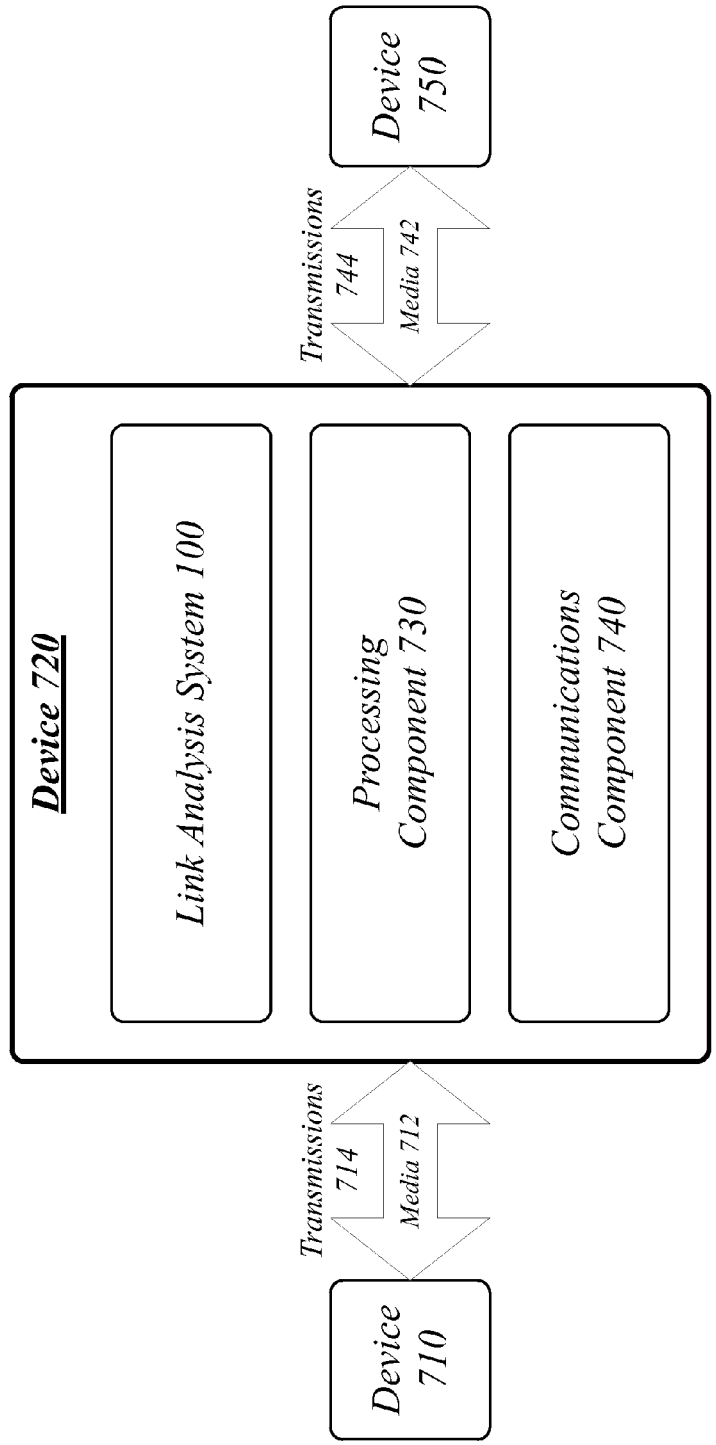
FIG. 7 illustrates an example of a centralized system for the link analysis system of FIG. 1.

FIG. 7 illustrates a block diagram of a centralized system 700. The centralized system 700 may implement some or all of the structure and/or operations for the link analysis system 100 in a single computing entity, such as entirely within a single device 720.

The device 720 may involve any electronic device capable of receiving, processing, and sending information for the link analysis system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 720 may execute processing operations or logic for the link analysis system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 720 may execute communications operations or logic for the link analysis system 100 using communications component 740. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712, 742 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated transmission, and so forth.

Examples of wireless communications media may include acoustic, radio-frequency (RF) spectrum, infrared and other wireless media.

The device 720 may communicate with other devices 710, 750 over a communications media 712, 742, respectively, using communications transmissions 714, 744, respectively, via the communications component 740. The devices 710, 750 may be internal or external to the device 720 as desired for a given implementation.

In some embodiments, device 710 may correspond to a user device, such as a user workstation, being used to connect to, configure, manage, or otherwise use the link analysis system 100. For instance, device 710 may be a client system connected to device 720 operating as a server system. Transmissions 714 sent over media 712 may therefore correspond to the submission of configuration commands from the user using device 710 to the link analysis system 100 implemented as device 720. Transmissions 714 received over media 712 may correspond to the reception of the link analysis results, such as a listing of entities which are believed to be associated with more than one record of data set 110.

In some embodiments, device 750 may correspond to a distributed storage device, such as a network-accessible database system. Transmissions 744 sent over media 742 may therefore correspond to an exchange of commands and data between the link analysis system 100 on device 720 and a network-accessible database system on device 750. For example, the link analysis system 100 may submit commands for the retrieval of records and receive the records in response to the submitted commands.

Figure 8:
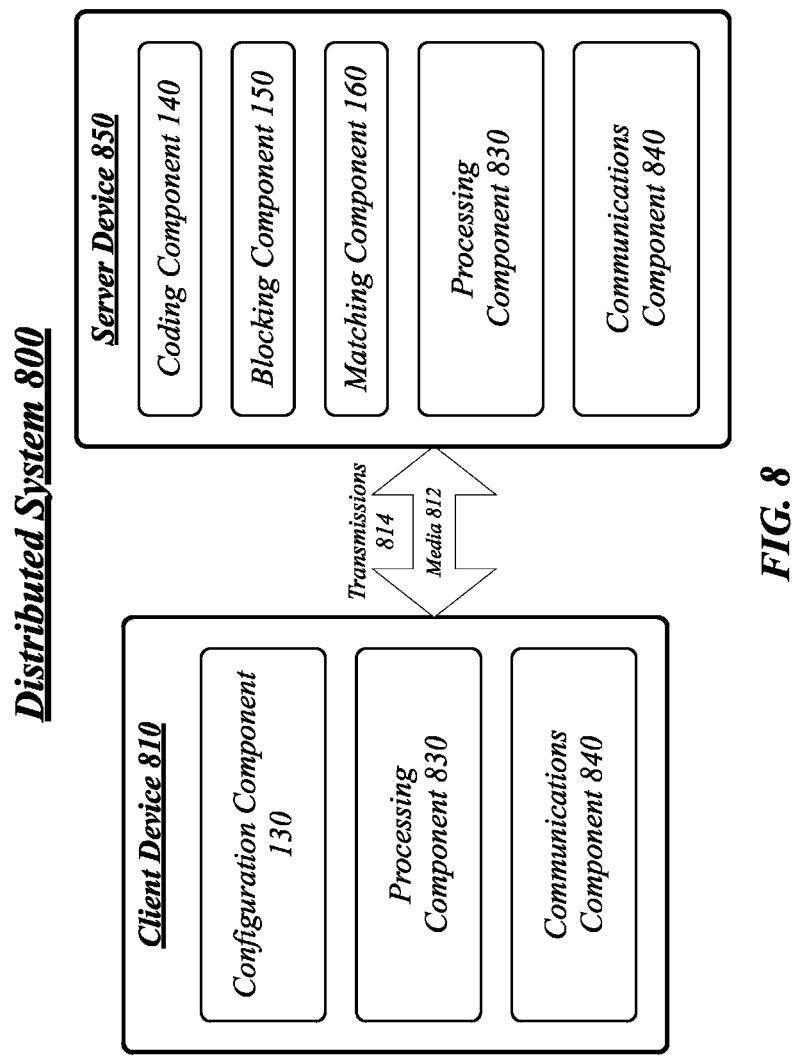
FIG. 8 illustrates an example of a distributed system for the link analysis system of FIG. 1.

FIG. 8 illustrates a block diagram of a distributed system 800. The distributed system 800 may distribute portions of the structure and/or operations for the link analysis system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a client device 810 and a server device 850. In general, the client device 810 and the server device 850 may be the same or similar to the device 720 as described with reference to FIG. 7. For instance, the client system 810 and the server system 850 may each comprise a processing component 830 and a communications component 840 which are the same or similar to the processing component 730 and the communications component 740, respectively, as described with reference to FIG. 7. In another example, the devices 810, 850 may communicate over a communications media 812 using communications transmissions 814 via the communications components 840.

The client device 810 may comprise or employ one or more client programs that operate to perform various methodologies in accordance with the described embodiments. In one embodiment, for example, the client device 910 may implement the configuration component 130. The configuration component 130, in this embodiment, may comprise a specialized software application designed for interfacing with a distributed link analysis system 100. The server device 850 may comprise or employ one or more server programs running on one or more server devices that operate to perform various methodologies in accordance with the described embodiments. In one embodiment, for example, the server device 850 may implement the coding component 140, blocking component 150, and matching component 160. In some embodiments, the server device 850 may correspond to a plurality of servers in a distributed computing environment, wherein a plurality of tasks are farmed out to the distributed servers for parallel processing. As such, a plurality of servers may each run a coding component 140, a blocking component 150, or a matching component 160. The configuration component 130 may therefore manage the submission of tasks to the distributed server environment, the transmissions 814 transmitted over media 812 corresponding to the submission of tasks and the reception of the results.

Figure 9:
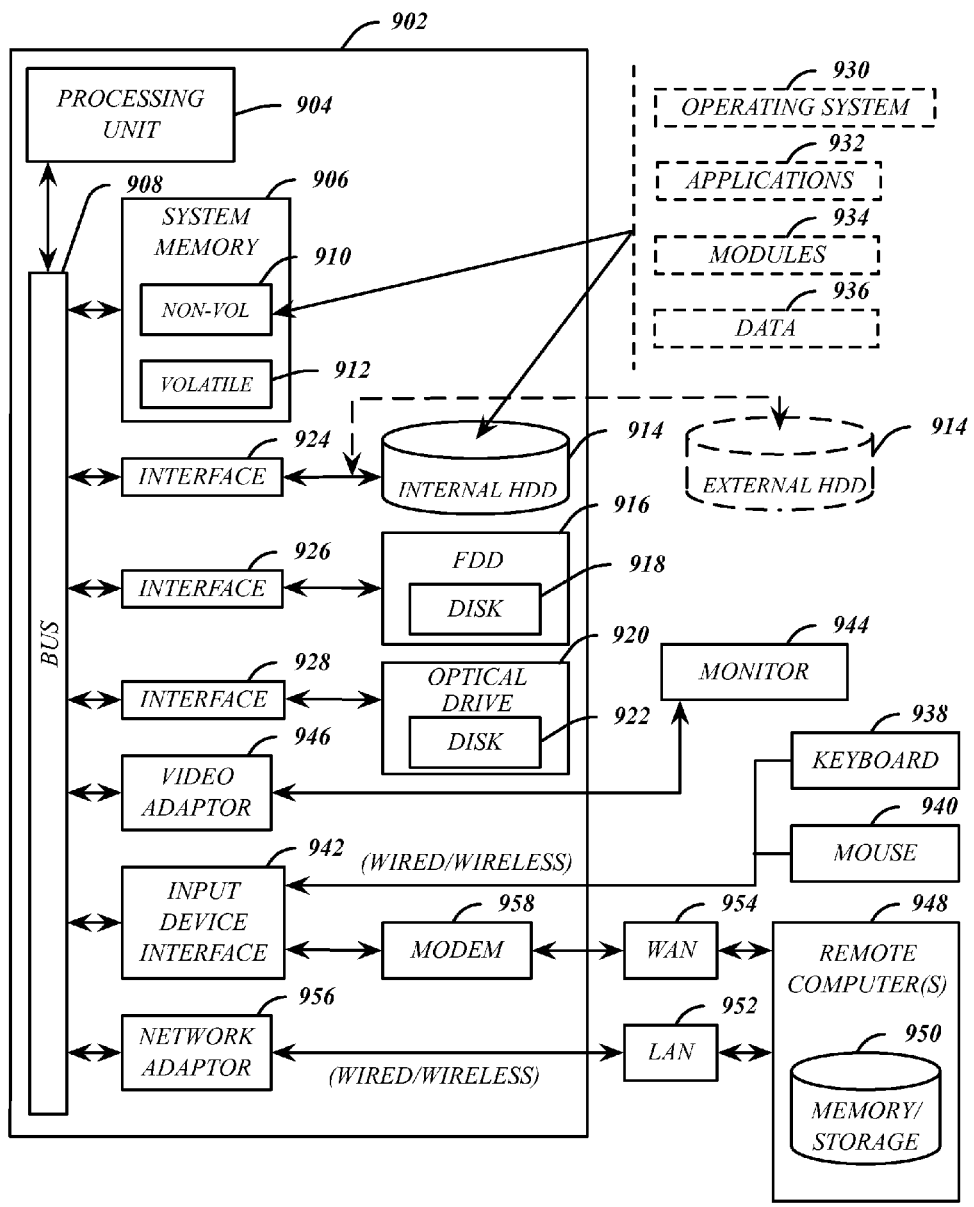
FIG. 9 illustrates an example of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of transmissions communicated over the communications media. The information can be implemented as transmissions allocated to various transmission lines. In such allocations, each message is a transmission. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the link analysis system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.9 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.9x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
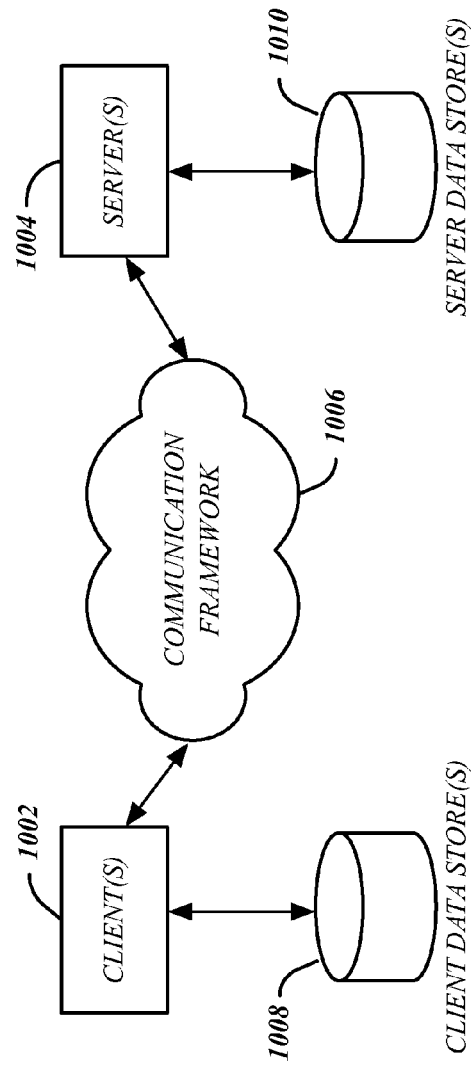
FIG. 10 illustrates an example of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may implement the client device 910. The servers 1004 may implement the server device 950. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The communication framework 1006 may be operative to provide communication between members of a distributed computing system, grid computing system, or other multi-computer computing system. For example, the communication framework 1006 may connect together geographically co-located computation devices cooperatively processing to solve one or more computational tasks. Alternatively or additionally, the communication framework 1006 may connect together geographically-separated computational devices performing mostly-independent processing components of a computational task, such as in grid computing. One or both of the client data store 1008 and server data store 1010 may form all or some of a distributed file system, such as may be provided by Apache® Hadoop®.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical transmissions capable of being stored, transferred, combined, compared, and otherwise manipulated. It proves convenient at times, principally for reasons of common usage, to refer to these transmissions as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. At least one non-transitory computer-readable storage medium comprising instructions that, when executed, cause a system to perform operations including:
   receive a data set comprising a plurality of records;
   receive blocking variables, the blocking variables present as variables in each of the plurality of records;
   generate match codes based on the blocking variables;
   produce a plurality of blocks of records from the data set based on the match codes; and
   match records within each of the plurality of blocks to determine entities referenced by more than one record by performing deterministic or probabilistic entity resolution based on similar variables of the records within each of the blocks.

2. The computer-readable storage medium of claim 1, wherein the deterministic or probabilistic entity resolution is based on one or more sensitivity levels associated with the match codes.

3. The computer-readable storage medium of claim 1, each of the plurality of records corresponding to an entity, the blocking variables selected as one or more of a name, a date of birth, a phone number, an identification number, and an address, wherein two records are matched if the two records are determined to correspond to a same entity.

4. The computer-readable storage medium of claim 1, wherein the record matching is performed to detect potential cases of fraud.

5. The computer-readable storage medium of claim 1, wherein the data set is a union of two data subsets, wherein matching records within each of the plurality of blocks comprises matching records between the two data subsets, comprising further instructions that, when executed, cause a system to perform operations including:
   exclude from the plurality of blocks those blocks that only contain records from one of the two data subsets prior to matching the records within each of the plurality of blocks.

6. The computer-readable storage medium of claim 1, the match codes comprising at least a first partial match code and second partial match code, the first partial match code corresponding to a first blocking variable of the blocking variables, the second partial match code corresponding to a second blocking variable of the blocking variable, comprising further instructions that, when executed, cause a system to perform operations including:
   receive an assignment of a first importance for the first blocking variable and a second importance for the second blocking variable; and
   generate the first partial match code using a first sensitivity; and
   generate the second partial match code using a second sensitivity, the first sensitivity lower than the second sensitivity based on the received assignment that the first blocking variable is more important than the second blocking variable.

7. The computer-readable storage medium of claim 1, each of the match codes comprising a plurality of partial match codes, wherein each block of the plurality of blocks includes every record from the data set that shares at least one partial match code with another record in the block.

8. The computer-readable storage medium of claim 1, comprising further instructions that, when executed, cause a system to perform operations including:
   determine a threshold quantity of records;
   determine that at least one block of the plurality of blocks includes at least the threshold quantity of records;
   generate narrowed match codes;
   produce a second plurality of blocks of records from the data set based on the narrowed match codes, wherein every block of the second plurality of blocks includes no more than the threshold quantity of records; and
   match records within each of the second plurality of blocks.

9. The computer-readable storage medium of claim 8, wherein the narrowed match codes produce blocks including no more than the threshold quantity of records based on at least one of the narrowed match codes having increased sensitivity for at least one attribute and a different set of blocking variables being used in generating the narrowed match codes.

10. A computer-implemented method, comprising:
    receiving a data set comprising a plurality of records;
    receiving blocking variables, the blocking variables present as variables in each of the plurality of records;
    generating match codes based on the blocking variables;
    producing a plurality of blocks of records from the data set based on the match codes; and
    matching records within each of the plurality of blocks by performing deterministic or probabilistic entity resolution based on similar variables of the records within each of the blocks.

11. The method of claim 10, wherein the deterministic or probabilistic entity resolution is based on one or more sensitivity levels associated with the match codes.

12. The method of claim 10, each of the plurality of records corresponding to an entity, the blocking variables selected as one or more of a name, a date of birth, a phone number, an identification number or an address, wherein two records are matched when the two records are determined to correspond to a same entity.

13. The method of claim 10, wherein the record matching is performed to detect potential cases of fraud.

14. The method of claim 10, wherein the data set is a union of two data subsets, wherein matching records within each of the plurality of blocks comprises matching records between the two data subsets, further comprising:
excluding from the plurality of blocks those blocks that only contain records from one of the two data subsets prior to matching the records within each of the plurality of blocks.

15. The method of claim 10, the match codes comprising at least a first partial match code and second partial match code each corresponding to one of the blocking variables, further comprising:
determining that the first partial match code is more important than the second partial match code; and
assigning the first partial match code a lower sensitivity than the second partial match code based on the determination that the first partial match code is more important than the second partial match code.

16. The method of claim 10, each of the match codes comprising a plurality of attributes, wherein each block of the plurality of blocks includes every record from the data set that shares at least one attribute with another record in the block.

17. The method of claim 10, comprising:
determining that at least one block of the plurality of blocks includes at least a threshold quantity of records;
generating narrowed match codes; and
producing a second plurality of blocks of records from the data set based on the narrowed match codes, wherein every block of the second plurality of blocks includes no more than the threshold quantity of records, wherein record matching is performed within each of the second plurality of blocks.

18. The method of claim 17, wherein the narrowed match codes produce blocks including no more than the threshold quantity of records based on at least one of the narrowed match codes having increased sensitivity for at least one attribute and a different set of blocking variables being used in generating the narrowed match codes.

19. An apparatus, comprising:
a processor circuit on a device;
a configuration component operative on the processor circuit to receive a data set comprising a plurality of records and operative to receive a set of blocking variables, the blocking variables present as variables in each of the plurality of records;
a coding component operative on the processor circuit to generate match codes based on the blocking variables;
a blocking component operative on the processor circuit to produce a plurality of blocks of records from the data set based on the match codes; and
a matching component operative on the processor circuit to match records within each of the plurality of blocks by performing deterministic or probabilistic entity resolution based on similar variables of the records within each of the blocks.

20. The apparatus of claim 19, wherein the deterministic or probabilistic entity resolution is based on one or more sensitivity levels associated with the match codes.

21. The apparatus of claim 19, each of the plurality of records corresponding to an entity, the blocking variables selected as one or more of a name, a date of birth, a phone number, an identification number or an address, wherein two records are matched when the two records are determined to correspond to a same entity.

22. The apparatus of claim 19, wherein the record matching is performed to detect potential cases of fraud.

23. The apparatus of claim 19, wherein the data set is a union of two data subsets, wherein matching records within each of the plurality of blocks comprises matching records between the two data subsets, the blocking component operative to exclude from the plurality of blocks those blocks that only contain records from one of the two data subsets prior to matching the records within each of the plurality of blocks.

24. The apparatus of claim 19, the match codes comprising at least a first partial match code and second partial match code, the first partial match code corresponding to a first blocking variable of the blocking variables, the second partial match code corresponding to a second blocking variable of the blocking variable, further comprising:
the configuration component receiving an assignment of a first importance for the first blocking variable and a second importance for the second blocking variable; and
the coding component operative to use a first sensitivity to generate the first partial match code and to use a second sensitivity to generate the second partial match code, the first sensitivity lower than the second sensitivity based on the assignment that the first blocking variable is more important than the second blocking variable.

25. The apparatus of claim 19, each of the match codes comprising a plurality of attributes, wherein each block of the plurality of blocks includes every record from the data set that shares at least one attribute with another record in the block.

26. The apparatus of claim 19, further comprising:
the configuration component operative to receive a threshold quantity of records;
the blocking component operative to determine that at least one block of the plurality of blocks includes at least the threshold quantity of records and to produce a second plurality of blocks of records from the data set based on narrowed match codes, wherein every block of the second plurality of blocks includes no more than the threshold quantity of records;
the coding component operative to generating the narrowed match codes; and
the matching component operative to match records within each of the second plurality of blocks.

27. The apparatus of claim 23, wherein the narrowed match codes produce blocks including no more than the threshold quantity of records based on at least one of the narrowed match codes having increased sensitivity for at least one attribute and a different set of blocking variables being used in generating the narrowed match codes.

* * * * *